April 22, 1969     E. ARBTER     3,440,110
GALVANIC CELL
Filed Aug. 3, 1965
*Fig. 1.*
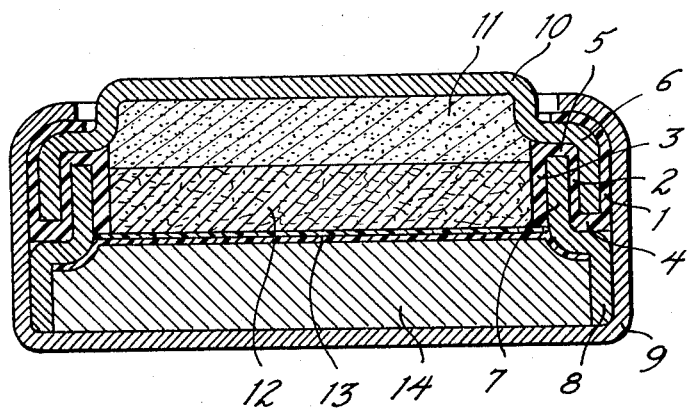
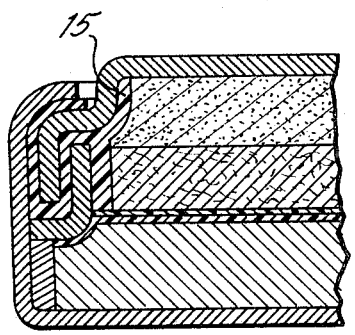
*Fig. 2.*
INVENTOR.
ERHARD ARBTER
BY Alfred Stapler
ATTORNEY

United States Patent Office 3,440,110
Patented Apr. 22, 1969

3,440,110
GALVANIC CELL
Erhard Arbter, Ellwangen, Jagst, Germany, assignor to Varta-Pertrix, Union G.m.b.H., Ellwangen, Jagst, Germany, a corporation of Germany
Filed Aug. 3, 1965, Ser. No. 476,885
Claims priority, application Germany, May 3, 1965, V 28,374
Int. Cl. H01m 1/02
U.S. Cl. 136—166    9 Claims

ABSTRACT OF THE DISCLOSURE

A galvanic cell or battery is provided in the form of a closed container wherein a separate internal supporting ring supports an elastic seal ring which electrically separates the cover from the housing while sealing the electrolyte from leakage.

---

This invention relates to a galvanic cell having a metal housing which forms one terminal of the cell and a metal cover which forms the other terminal, and having an elastic seal inserted between housing and cover, this seal insulating the two terminals electrically from each other and simultaneously sealing off the cell element.

Cells of this type are known. Their closure requires special care. Particularly for alkaline cell elements, whose alkaline electrolyte has high leakage capability, closure must be carried out with extreme care if electrolyte leakage is to be completely prevented.

Heretofore, the seals which have generally been used, have been in the form of ordinary rings, or of rings having various profiles, such as L- or U-shaped cross-sections. These do not permit a closure of the cell which remains effective over extended periods of time, even though an economically unjustifiable degree of care may have been exercised in the manufacturing process.

To obtain a more effective sealing of the cell it has been proposed, for example, to carry out the closure of the cell after insertion of the seal in two separate process steps, e.g. by compressing the seal first radially and then parallel with respect to the axis of the cell. A seal is then obtained only after the second of the above-mentioned steps. However, in the first step some electrolyte has already leaked out. To eliminate any traces of this electrolyte, the cells must therefore be washed and dried after closure. A further drawback is that in the closure process a path to the outside is provided for the electrolyte; this makes the fluid tightness of the element questionable.

It is accordingly an object of the invention to overcome the above-mentioned drawbacks of the prior art.

This and other objects which will appear are achieved in accordance with the invention by forming the seal and inserting it in the cell in such a way as to create, for the electrolyte, a long leakage path which changes direction several times. Moreover, the seal is placed under pressure at several points along the leakage path in order to provide multiple barriers against electrolyte leakage. The form of the seal is so chosen that, in filling the cell with electrolyte during manufacture, no special precautions need be taken and the electrolyte can be introduced very quickly. Moreover, the seal may be so formed that the negative electrode can be inserted, or poured into it, in tablet or powder form, respectively.

For further details, reference is made to the description which follows and the accompanying drawings, wherein
  FIGURE 1 shows one embodiment of the invention, and
  FIGURE 2 shows another embodiment thereof.
The same reference numerals are used to designate corresponding elements in the two figures.

Referring to FIGURE 1, the embodiment shown therein comprises a metal housing 9 forming the positive terminal of the cell. The cell in this figure, as well as in FIGURE 2, is shown in its closed condition, after the housing 9 has had its upper edge bent over into a rim. Before that rim is formed, the components of the cell can be readily introduced into the housing 9. Preferably, the depolarizer 14, which may consist of mercuric oxide and graphite, for example, is first pressed together with support ring 8 and can then again be subjected to pressure after insertion into the metal housing. This establishes intimate electrical contact between the metal housing and the depolarizer. Since the cells in accordance with this invention are primarily intended for alkaline electrolyte solutions, the depolarizer may also consist of manganese dioxide or silver oxide containing a suitable conductive material.

When mercuric oxide is used, the depolarizer may be composed of 90% mercuric oxide, and 2 to 5% graphite, the balance being an alkaline electrolyte.

Separator 13 can consist of several discs, which separate the depolarizer from the negative electrode. For example, alkali-resistant cellophane may be used for the separator. Microporous polyamides, such as nylon or parchment may also be used. In addition, the separator usually contains a highly absorbent, alkali-resistant layer 12 which receives the major part of the electrolyte, and which may be made of absorbent cellulose, for example. The negative electrode 11 may consist, for example, of amalgamated zinc powder which may be used either in powder form, or pressed into tablets.

The seal itself may consist, for example, of polyethylene or polyamide. Other plastics may also be used. For a seal according to the present invention, it is not necessary to use a plastic of exceptional strength or resistance to cold flow, as is required for other embodiments of this seal. Examples of suitable materials are high polymer plastics, such as the high polymer polyethylene available from the firm BASF under the name "Lupol" and nylon- or perlon-base plastics traded under the name "Ultramid."

The seal takes the form of three concentric rings, respectively designated 1, 2 and 3, the outermost ring 1 being provided with an upward extension. The rings are joined to each other by links 4 and 5, arranged generally perpendicularly to the rings, so that the seal forms one integral piece. The seal surrounds edge 6 of lid 10, as well as the upper portion 7 of support ring 8, which is spaced from housing 9. After closure of the cell, links 4 and 5, and the extension of outer ring 1 are subjected to pressure directed parallel to the axis of the element. By virtue of this shape and construction of the seal, the leakage path is extraordinarily long and the circumferential pressure points provide a plurality of effective barriers against leakage of the electrolyte.

Housing 9 may be made of any suitable material, such as nickel-plated sheet steel. Support ring 8 may also be made of any suitable material, such as bare, or nickel-plated sheet steel. Preferably both ring 8 and housing 9 are made of deep drawn sheet steel.

FIGURE 2, to which reference may now be had, shows an embodiment of a cell in accordance with this invention which differs from that of FIGURE 1 in that the innermost sealing ring also has an upward extension 15. This embodiment is especially suitable for introduction of the zinc electrode in powder form. The extended inner ring then receives the powder mass and, upon closure by cover 10, compresses that powder mass in axial direction to a predetermined extent. This produces intimate electrical connection between negative electrode 11 and cover 10.

In both embodiments the ring-shaped edge 6 of cover 10 extends into the channel formed by the metal housing and the support ring to a depth which is preferably several times greater than the thickness of the cover material. It has also proven desirable to distribute the pressure points of the seal so that they are displaced from each other by a distance which is several times the metal thickness of the cover or support ring. At these pressure points the seal is compressed to about 50% of its initial thickness, so that material expansion in response to temperature variations can be accommodated. The somewhat rough-surfaced portions of the housing and cover adjacent to the pressure points improve the seal still further. Special roughening is not required, however, since the metal parts, being mostly stamped, have sufficiently rough surfaces.

I claim:

1. A galvanic cell having a metal housing forming one terminal and a metal cover having a dependent edge and forming the other terminal of the cell disposed within the upper portion of said housing and an elastic seal separating the housing and cover, said seal insulating the terminals electrically from each other and also sealing off the cell, said cell being characterized in that: the metal housing contains a separate support ring, having upper and lower portions, the lower portion of said support ring is within and contiguous to the interior wall of said housing, and the seal comprises three concentric rings encircling both the upper portion of said support ring which is spaced from the interior wall of said housing and the dependent edge of the cover, the outermost concentric ring having an upward extension and all three concentric rings being joined to each other by links disposed generally perpendicularly to the rings and forming an integral structure with the rings.

2. In a galvanic cell which has a metal housing, said housing establishing one terminal of the cell,
   a metal cover, disposed within the upper portion of said housing and said cover having a dependent edge and establishing the opposite terminal of the cell and being in electrolytical contact with the opposite terminal,
   an elastic seal sealing off the cell, separating the housing from the cover, and electrically insulating the terminals from each other, and
   a separate support ring, said ring having an upper and a lower portion, the lower portion being contiguous with the interior wall of said housing,
   said seal comprising three rings encircling the upper portion of said support ring which is spaced from the interior wall of said housing and the dependent edge of the cover, respectively, the outermost concentric ring having an upward extension and all three concentric rings being joined to each other by links disposed generally perpendicularly to the rings and forming an integral structure with the rings.

3. The cell of claim 2 further characterized in that the separate support ring has inner and outer cylindrical walls, a lower outer wall part of which is adjacent to the housing, and upper outer and inner wall parts of which are offset inwardly toward the vertical axis of the cell, said cell has at least one separator disc which extends substantially to the inner wall of the lower portion of said support ring below the offset thereof; and the inner wall of said offset portion of said support ring rests upon the top surface of said separator disc along the edge thereof.

4. A galvanic cell according to claim 2 further characterized in that the links and the upward extension of the outermost concentric ring are subjected to pressure parallel to the axis of the cell.

5. A galvanic cell according to claim 2 characterized in that the metal housing and the upper portion of the support ring form a channel and that the dependent edge of the cover extends into the channel to a distance several times the thickness of the material from which the cover is formed.

6. A galvanic cell according to claim 2 characterized in that the seal is made of plastic material.

7. The cell of claim 6 further characterized in that the plastic material is selected from the group of polyethylene and polyamide.

8. The cell of claim 4 further characterized in that the points at which said pressure is applied are displaced radially from each other by distances equal to several times the metal thickness of the cover or support ring.

9. The galvanic cell of claim 2 further characterized in that the innermost of the concentric rings also has an upward extension.

References Cited

UNITED STATES PATENTS

| 1,237,733 | 8/1917 | Willard | 136—170.1 |
| 1,279,953 | 9/1918 | Willard | 136—170.1 |
| 2,617,863 | 11/1952 | Stinson | 136—133 |
| 3,210,217 | 10/1965 | Tamminen | 136—133 |

JOHN H. MACK, *Primary Examiner.*

C. F. LE FEVOUR, *Assistant Examiner.*

U.S. Cl. X.R.

136—133